United States Patent [19]
Granda-Cabrera

[11] Patent Number: 5,974,598
[45] Date of Patent: Nov. 2, 1999

[54] PORTABLE TOILET

[76] Inventor: Maderlene Granda-Cabrera, 4201 SW. 11 St., Miami, Fla. 33134

[21] Appl. No.: 09/151,831

[22] Filed: Sep. 11, 1998

[51] Int. Cl.$^6$ ............................. A47K 11/04; A47K 13/06
[52] U.S. Cl. ......................................... 4/483; 4/484; 4/239
[58] Field of Search ............................. 4/239, 484, 483, 4/476, 478, 254, DIG. 5

[56] References Cited

U.S. PATENT DOCUMENTS

| | | | |
|---|---|---|---|
| 804,019 | 11/1905 | Lotz | 4/483 X |
| 1,246,791 | 11/1917 | Salati | 4/483 |
| 2,682,914 | 7/1954 | Wing | 4/239 X |
| 2,776,438 | 1/1957 | Zeraffa | 4/483 |
| 2,804,121 | 8/1957 | Singleton | 4/483 |
| 3,371,356 | 3/1968 | Benjamin | 4/239 |
| 5,161,263 | 11/1992 | Geneve et al. | 4/239 X |

*Primary Examiner*—David J. Walczak
*Assistant Examiner*—Kathleen J. Prunner
*Attorney, Agent, or Firm*—J. Sanchelima

[57] ABSTRACT

A portable toilet that can be used as a stand alone device or in conjunction with existing toilet facilities. A substantially rectangular seat housing is provided with a pivotally mounted cover member that also acts as a back rest preventing the user, typically a small child, to come in contact with the fixture. A cooperatively positioned opening receives a flanged tubular member trapping a bag for receiving a user's excrements. A pivotally mounted ring secures the tubular member in place. Two pivotally mounted leg assemblies extend outwardly and can be selectively distended 180 degrees resting on the rim of the toilet furniture. When folded inwardly, the leg assemblies are kept in place with a pressure sensitive lock assembly such as hook and loop-type fasteners.

9 Claims, 3 Drawing Sheets

PORTABLE TOILET

BACKGROUND OF THE INVENTION

1. Field of the Invention

The present invention relates to portable toilets, and more particularly, to the type that can be selectively used on a toilet bowl or by itself.

2. Description of the Related Art

The need to insulate children from unsanitized rest room fixtures, such as toilets, and specially those in public rest rooms is quite obvious. None of the devices known to applicant provide for a dual function of a stand alone portable toilet and portable toilet seat for a toilet. This dual purpose feature enhances the versatility of the present invention for most situations encountered by parents accompanying their children.

Applicant believes that the closest reference corresponds to U.S. Pat. No. 2,776,438 issued on Jan. 8, 1957 to Zeraffa for a child's portable chamber pot. This patented device is a stand above portable toilet also. However, it differs from the present invention because it can not be mounted on an existing toilet, like the present invention, by extending the legs. This feature allows the user (parents) to use public facilities when available avoiding contact with the rest room furniture.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a portable toilet that can be selectively used as a stand alone device or as a seat with toilet fixtures.

It is another object of this invention to provide a portable toilet that can be readily folded and stored/transported with maximum volumetric efficiency while still being comfortable.

It is still another object of the present invention to provide a portable toilet that can be readily cleaned and washed.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
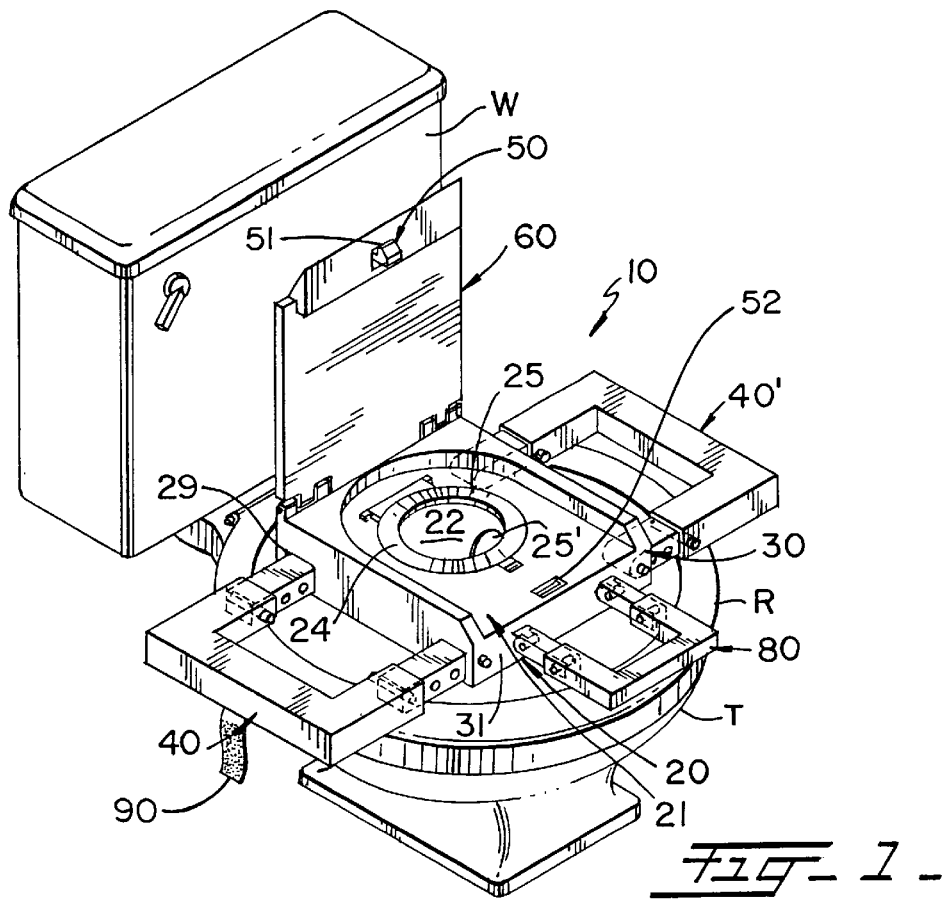
FIG. 1 represents an isometric view of the present invention mounted on a toilet fixture.

Referring now to the drawings, where the present invention is generally referred to with numeral 10, it can be observed that it basically includes seat assembly 30 with pivotally mounted leg assemblies 40 and 40', and pivotally mounted back rest assembly 60. Leg rest assembly 80 is pivotally and telescopically mounted to seat assembly 30, opposite to back rest and cover assembly 60. Back rest and cover assembly 60 can be selectively brought to a substantially vertical position or allowed to rest on water tank W. Locking mechanism 50 releasably locks assembly 60 to housing 21. One of the preferred embodiments utilizes latch member 51 and cooperating surface 52. Its purpose is to prevent the user's contact with the bathroom furniture.

Figure 4:
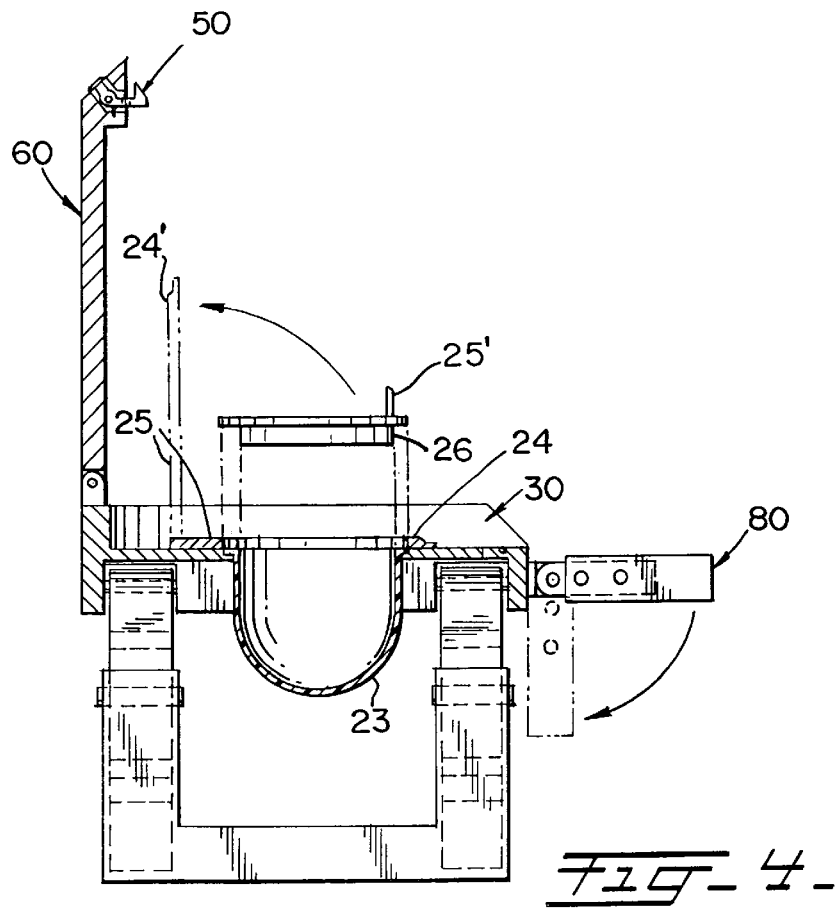
FIG. 4 is an elevational cross-sectional view of the present invention.

As shown in FIG. 1, seat assembly 30 includes a seat housing 21 of substantially rectangular shape with a cooperatively located opening 22. As shown in FIG. 4, pivotally mounted ring 24 moves to position 24' when replacing bag 23. Tubular member 26 that extends passes through opening 22 trapping bag 23. Upperside 25 of seat member 21 is cushioned. Guard wall 25' is mounted on the inner surface of tubular member 26 and extends upwardly to prevent any urine spillage by the user.

Figure 2:
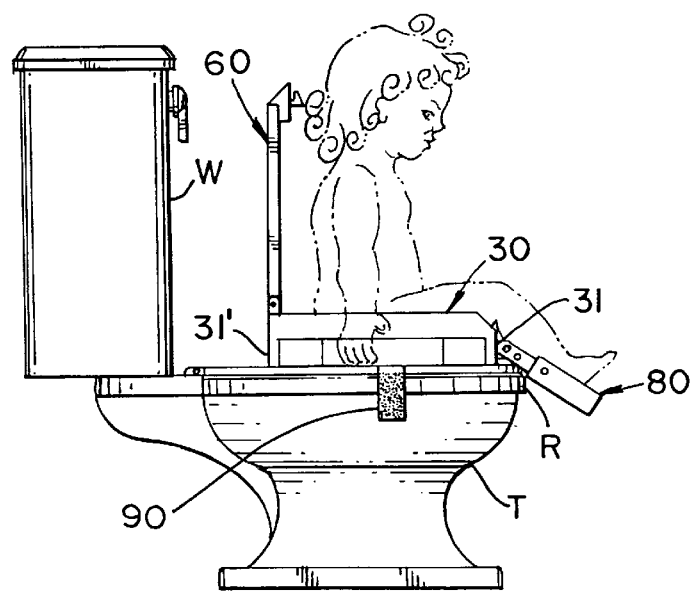
FIG. 2 shows a side elevational view of the toilet fixture and the present invention.
Figure 3:
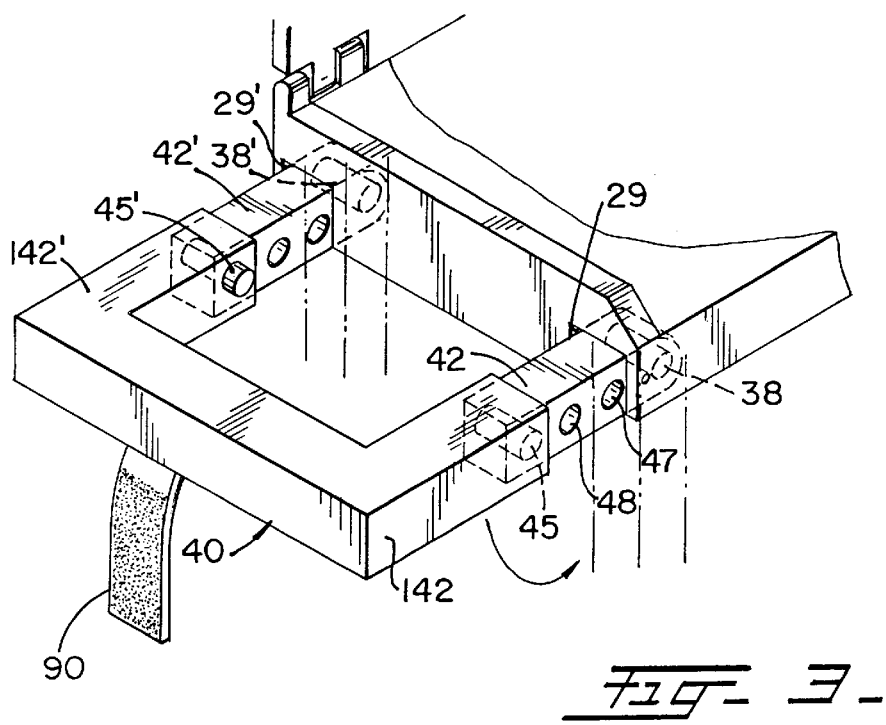
FIG. 3 illustrates an enlarged detail view of the pivotally mounted leg assembly.

FIG. 2 shows front and rear walls 31 and 31' with openings that permit axle 38 and 38' to be mounted and cooperatively receive one end of leg assemblies 40 and 40'. FIG. 3 shows one of the manners for mounting leg assembly 40. Openings 47 and 48 are cooperatively positioned to permit leg assembly 40 to be locked in place at pre-selected angles. As seen in FIGS. 1 and 3, leg assemblies 40 and 40' are pivotally mounted to opposite sides of seat assembly 30. In one position, leg assemblies 40 and 40' extend in substantially co-planar relationship with seat assembly 30 so that it can be placed over toilet T. Assemblies 40 and 40' rest on rim R of toilet T.

As best seen in FIG. 3, assembly 40 is pivotally mounted to assembly 30 through axle pins 38 and 38'. Assembly 40 includes leg members 42 and 42'. Tubular extension leg members 142 and 142' telescopically receive members 42 and 42' at a predetermined position by inserting pins 45 and 45' through one of several openings 47 and 48. Leg assemblies 40 and 40' are foldable within the underside of seat assembly 30. As it can be seen in FIG. 3, assembly 40 does not pivot beyond its coplanar position with respect to the plane of seat assembly 30 because edges 29 and 29' coact against the upper surface of tubular extension members 142 and 142'.

It can be seen from FIG. 2 that leg rest assembly 80 can be telescopically extended and its distal end 20 permitted to pivot to a position that is comfortable for the user.

Figure 5:
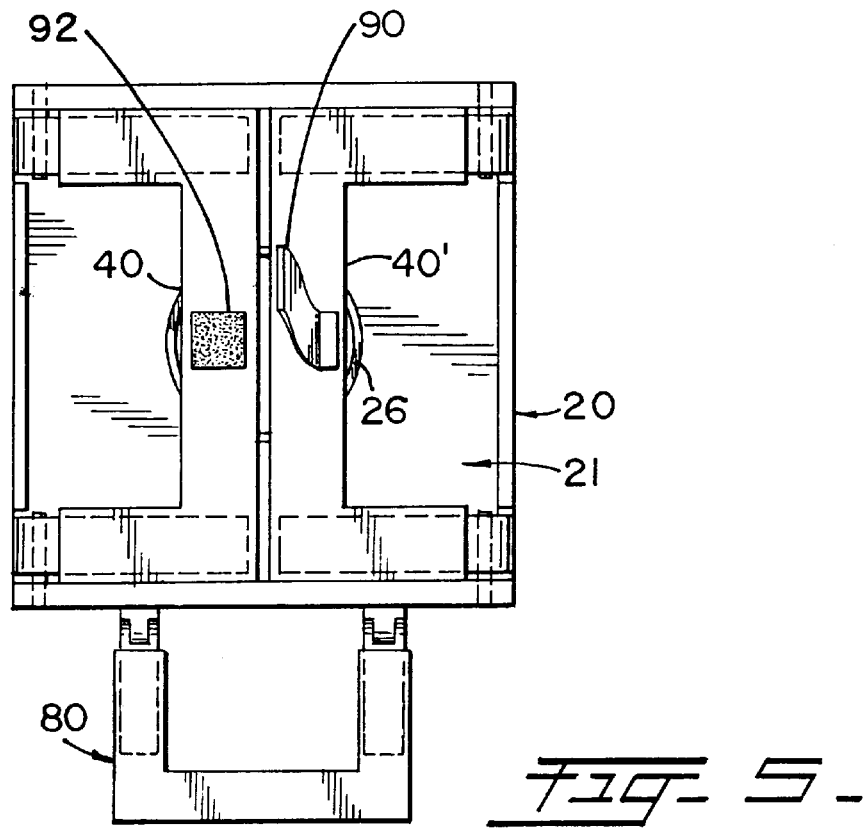
FIG. 5 is a top view of the present invention partially closed.

FIG. 5 shows the present invention folded and ready to be stored or transported. Leg rest assembly 80 is used as a telescopically extended handle and it can also be retracted, if desired. Hook and loop-type fasteners strap 90 with cooperating pad 92 permit a user to keep leg assemblies 40 and 40' folded in place.

Figure 6:
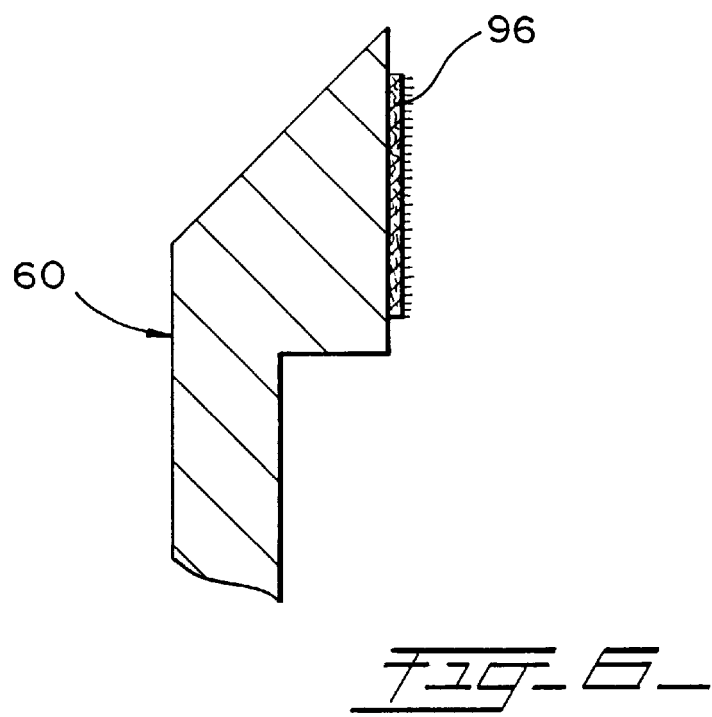
FIG. 6 is a partial view of the cover assembly end with an alternate locking mechanism.

In FIG. 6, an alternate embodiment for locking assembly 50 is shown where it is implemented with hook and loop-type fasteners strap 96 instead of hardware.

The foregoing description conveys the best understanding or the objectives and advantages of the present invention.

Different embodiments may be made of the inventive concept of this invention. It is to be understood that all matter disclosed herein is to be interpreted merely as illustrative, and not in a limiting sense.

What is claimed is:

1. A portable toilet to be used selectively as a stand alone device and with existing toilet fixtures that include a bowl with a uniform rim, comprising:

A) a seat assembly having a seat housing with a substantially rectangular shape including two pairs of opposite sides with a centrally disposed through opening and said seat housing including an upperside and an underside, and;

B) two pivotally mounted leg assemblies mounted each to one of said opposite sides in one of said pairs, locking means to lock said leg assemblies at pre-selected angles, said leg assemblies being foldable against said underside in one extreme position and held fast in this position by fastner means, said leg assemblies being foldable against said underside in one extreme position and distended and locked in position by said locking means at an angle of 180 degrees to a substantially coplanar relationship with respect to said seat assembly for the other extreme position so that said portable toilet is supported by said leg assemblies resting on said rim, and said leg assemblies being extendable and locked in position by said locking means at an angle of 90 degrees with respect to said seat assembly so that said portable toilet is a self supported toilet.

2. The portable toilet set forth in claim 1 further including:

C) a removable tubular member having a peripheral flange and a cylindrical extension perpendicularly mounted to said flange, said cylindrical extension having cooperative dimensions that permit it to go through said centrally disposed opening, and further including a flexible plastic bag with an aperture defining a peripheral edge, said peripheral edge being trapped by said flange.

3. The portable toilet set forth in claim 2 further including:

D) a pivotally mounted cover having cooperative dimensions to define a compartment when brought in substantial adjacent and coplanar relationship with said seat assembly, and said tubular member being housed within said seat housing and said cover.

4. The portable toilet set forth in claim 3 wherein said seat assembly includes a ring member pivotally mounted to said upperside of the seat housing, adjacent to said opening, so that said tubular member is kept in place.

5. The portable toilet set forth in claim 4 wherein said opening includes a counter bore with an internal step against which said flange rest.

6. The portable toilet set forth in claim 5 further including:

E) a leg rest assembly pivotally mounted to one of said sides.

7. The portable toilet set forth in claim 6 wherein said pivotally mounted leg assemblies include means for keeping them in the folded position.

8. The portable toilet set forth in claim 7 wherein said pivotally mounted cover includes an underside that further includes locking means for releasable keeping said cover against said seat assembly.

9. The portable toilet set forth in claim 8 wherein said locking means includes hook and loop-type fasteners.

* * * * *